United States Patent [19]

de Boer et al.

[11] Patent Number: 5,162,424

[45] Date of Patent: * Nov. 10, 1992

[54] POLYMER MIXTURE COMPRISING POLYBUTYLENE TEREPHTHALATE AND THERMOPLASTIC ELASTOMER; ARTICLES FORMED THEREFROM

[75] Inventors: Jan de Boer, Milly sur Therain, France; Farshid Tabankia, Brasschaat, Belgium

[73] Assignee: General Electric Company, Pittsfield, Mass.

[*] Notice: The portion of the term of this patent subsequent to Feb. 13, 2007 has been disclaimed.

[21] Appl. No.: 507,412

[22] Filed: Apr. 10, 1990

[30] Foreign Application Priority Data

Apr. 12, 1989 [NL] Netherlands ............... 8900910

[51] Int. Cl.$^5$ .................................................. C08L 67/02
[52] U.S. Cl. .................................... 524/505; 524/513; 525/92; 525/173; 525/177
[58] Field of Search ............ 525/173, 92, 177; 524/505, 513

[56] References Cited

U.S. PATENT DOCUMENTS

| 3,624,024 | 11/1972 | Caldwell et al. | 260/40 R |
|---|---|---|---|
| 3,907,926 | 9/1975 | Brown et al. | 260/860 |
| 4,034,016 | 7/1977 | Baron et al. | 260/858 |
| 4,141,927 | 2/1979 | White et al. | 260/857 PA |
| 4,186,257 | 1/1980 | Blahak et al. | 521/159 |
| 4,203,887 | 5/1980 | Goedde et al. | 260/40 R |
| 4,228,249 | 10/1980 | Blahak et al. | 521/159 |
| 4,279,801 | 7/1981 | Kramer et al. | 260/40 R |
| 4,332,855 | 6/1982 | Zingheim et al. | 428/379 |
| 4,539,370 | 9/1985 | Nouvertne et al. | 527/67 |
| 4,544,734 | 10/1985 | McCready | 528/288 |
| 4,556,688 | 12/1985 | McCready et al. | 525/33 |
| 4,556,705 | 12/1985 | McCready | 528/289 |
| 4,587,272 | 5/1986 | Avakian et al. | 521/86 |
| 4,636,544 | 1/1987 | Hepp | 524/411 |
| 4,657,973 | 4/1987 | Endo et al. | 525/67 |
| 4,900,784 | 2/1990 | Tabankia et al. | 525/67 |

FOREIGN PATENT DOCUMENTS

| 850419 | 1/1977 | Belgium . |
|---|---|---|
| 0048483 | 3/1982 | European Pat. Off. . |
| 0065777 | 12/1982 | European Pat. Off. . |
| 0102115 | 3/1984 | European Pat. Off. . |
| 0150454 | 8/1985 | European Pat. Off. . |
| 0191283 | 8/1986 | European Pat. Off. . |
| 0248352 | 12/1987 | European Pat. Off. . |
| 8820218 | 7/1989 | European Pat. Off. . |
| 2338615 | 2/1974 | Fed. Rep. of Germany . |
| 2460257 | 7/1975 | Fed. Rep. of Germany . |
| 2915155 | 11/1979 | Fed. Rep. of Germany . |
| 2255345 | 7/1975 | France . |
| 2311815 | 12/1976 | France . |
| 2316283 | 1/1977 | France . |
| 1431916 | 4/1976 | United Kingdom . |
| 1592206 | 7/1981 | United Kingdom . |

Primary Examiner—Patricia A. Short
Attorney, Agent, or Firm—Mary Montebello

[57] ABSTRACT

The invention relates to polymer mixtures which comprise a polybutylene terephthalate, a thermoplastic elastomer, and a brominated polystyrene. The polymer mixtures according to the invention have a combination of the following favorable properties: a good flexibility, a good flow of the melt, good flame-retarding properties and a high tracking index.

12 Claims, No Drawings

POLYMER MIXTURE COMPRISING POLYBUTYLENE TEREPHTHALATE AND THERMOPLASTIC ELASTOMER; ARTICLES FORMED THEREFROM The invention relates to a polymer mixture which comprises the following constituents:
A. a polybutylene terephthalate;
B. a thermoplastic elastomer.

The invention also relates to articles formed from the polymer mixture according to the invention. Polymer mixtures which comprise a polybutylene terephthalate and a thermoplastic elastomer, for example, a polyether-ester block copolymer, are known, for example, from DE-C-2338615 and DE-B-2460257. The addition of flame-retardants is not mentioned in these publications.

The addition of flame-retarding, halogen-containing compounds to polybutylene terephthalates is described in EP-A-0065777. A great number of compounds are mentioned as suitable flame-retardants including, for example, polycarbonate oligomers prepared starting from brominated bisphenol A and brominated polystyrene.

Polymer mixtures which comprise a polybutylene terephthalate, a brominated polystyrene, an aromatic polycarbonate and an agent to improve the impact strength are described in the non-prepublished EP-A-88202188.4. The polymer mixtures just mentioned hereinbefore have a good tracking index and good flame-retarding properties.

The invention provides polymer mixtures which comprise a polybutylene terephthalate and a thermoplastic elastomer. The polymer mixtures according to the invention have the following combination of properties: a good flexibility, a good flow of their melt, good flame-retarding properties and a high tracking index.

The polymer mixture according to the invention is characterised in that the polymer mixture comprises in addition C. a brominated polystyrene as a flame-retardant.

The polymer mixture according to the invention preferably comprises a polyether-ester block copolymer, or a polyester-ester urethane or a polyether imide ester as constituent B.

The composition of the polymer mixture according to the invention is preferably such that the polymer mixture comprises per 100 parts by weight of the sum of the constituents A, B and C
50–80 parts by weight of constituent A,
5–20 parts by weight of constituent B, and
15–30 parts by weight of constituent C.

The polymer mixture according to the invention comprises as constituent A, a polymer or a copolymer which is built up for more than 70 mol% from units derived from terephthalic acid and butane-1,4-diol.

It is possible to use in the polymer mixtures according to the invention a metal compound (for example, antimony oxide) which cooperates synergistically with the brominated polystyrene.

The polymer mixture according to the invention comprises at any rate the following constituents:
A. a polybutylene terephthalate
B. a thermoplastic elastomer, and
C. a brominated polystyrene.

A. POLYBUTYLENE TEREPHTHALATE

Polybutylene terephthalate is a polymer known per se. It is derived from butane-1,4-diol and terephthalic acid. It is possible to use in the polymer mixtures copolyesters in which a part of the diol compound and/or a part of the terephthalic acid have/has been replaced by another diol and/or carboxylic acid. For the polymer mixture according to the invention it is to be preferred to use a polybutylene terephthalate which is built up for more than 70 mol% from units derived from butane-1,4-diol and terephthalic acid.

It is possible to use polybutylene terephthalate in which a branching agent, for example, a glycol having three or more hydroxyl groups or a trifunctional or multifunctional carboxylic acid, has been incorporated.

THERMOPLASTIC ELASTOMER

Various types of thermoplastic elastomers may be used in the polymer mixture according to the invention. Examples are the known polyether-ester block copolymers, polyester-ester urethanes and polyether imide esters.

Polyether-ester block copolymers are generally obtained by condensation polymerisation of one or more dicarboxyic acids, one or more long-chain glycols and one or more short-chain glycols. Examples of suitable polyether-ester block copolymers are described in DE-C-2338615 and DE-B-2460257 as well as in the literature references mentioned therein.

As a polyester-ester urethane is preferably used a block copolymer which is built up from polyester-ester units which are bonded by means of groups of the formula $R_1[NHC(0)]p$, wherein $R_1$ is a polyfunctional group having at most 30 carbon atoms and p has a value of 2 or 3, and in which the polyester-ester units are built up from blocks having a number of ester units of the formula —0G0C(0)$R_2$C(0)— and blocks having a number of ester units which are capable of forming a bifunctional polyester or polyester amide having a melting-point lower than 100° C., which blocks are bonded together by ester bonds, in which at least 80 mol% of the $R_2$ groups are 1,4-phenylene radicals and in which at least 80 mol% of the G-groups are a tetramethylene group.

Such polymers and their mode of preparation are described for example in EP-A-0102115, U.S. Pat. No. 4,186,257 and 4,228,249.

As a polyether imide ester is preferably used a block copolymer obtained by reaction of a diol having a low molecular weight, a dicarboxylic acid, a poly(oxyalkylene) diamine and a tricarboxylic acid or a derivative thereof. Such polymers are described, for example, in U.S. Pat. No. 4,544,734, 4,556,705 and 4,556,688.

C. BROMINATED POLYSTYRENE

Brominated polystyrenes are known flameretardants for synthetic resins. They are commercially available. They may comprise, for example, approximately 40–70% by weight of bromine.

The use of other flame-retardants seems not possible: in that case the above-mentioned combination of properties is not obtained.

In addition to the constituents mentioned hereinbefore the polymer mixture according to the invention may moreover comprise conventionally used additives. Suitable additives are pigments and dyes, reinforcing fibres, stabilisers, transesterification inhibitors, flame-retardants, mould-release agents, etc.

The polymer mixture according to the invention can be obtained according to the methods conventionally used for the preparation of polymer mixtures, for example, by melt extrusion.

EXAMPLES I TO IV, COMPARATIVE EXAMPLES A AND B

The following constituents were used in the examples:

PBT: a polyester derived from butanediol and terephthalic acid having an intrinsic viscosity of 1.20 dl/g, measured in a 60/40 mixture of phenol/tetrachloroethane at 25° C.

TPE-1: a polyether imide ester commercially available under the indication LOMOD® J10.

TPE-2: a polyether ester block copolymer commercially available under the indication HYTREL® 4059.

TPE-3: a polyether ester having polypropylene glycol blocks commercially available under the indication ARNITEL PM 380.

FR-1: a brominated polystyrene having a bromine content of approximately 65% by weight.

FR-2: a brominated carbonate polymer.

AOC: a mixture of 85% by weight of $Sb_2O_3$ and 15% of a carrier polymer.

T: a polytetrafluorethylene compound.

O: a mixture of other conventionally used additives (stabiliser + mould-release agent).

The constituents mentioned hereinbefore were compounded in an extruder and pelletised in the quantities as indicated in the table hereinafter. Standardised test pieces were injection-moulded from the resulting pellets to determine the flammability class according to UL-94, to determine the comparative tracking index according to IEC, 1979 (3rd edition), to test the glow wire test according to IEC: 695-21 (1st edition), and to determine a few mechanical properties.

The results obtained are also recorded in the table hereinafter.

TABLE

|  | Example No. | | | | | |
| --- | --- | --- | --- | --- | --- | --- |
|  | A | B | I | II | III | IV |
| Composition (parts by weight) | | | | | | |
| PBT | 74.3 | 57.2 | 64.3 | 59.3 | 64.3 | 64.3 |
| TPE-1 | — | 10 | 10 | 15 | — | — |
| TPE-2 | — | — | — | — | 10 | — |
| TPE-3 | — | — | — | — | — | 10 |
| FR-1 | 18 | — | 18 | 18 | 18 | 18 |
| FR-2 | — | 26 | — | — | — | — |
| AOC | 7 | 6.1 | 7 | 7 | 7 | 7 |
| T | 0.25 | 0.25 | 0.25 | 0.25 | 0.25 | 0.25 |
| O | 0.45 | 0.45 | 0.45 | 0.45 | 0.45 | 0.45 |
| Properties | | | | | | |
| Tensile strength at flow (MPa) | 51 | 47 | 42 | 36 | 40 | 41 |
| Elongation at fracture (%) | 6 | 9 | 13 | 16 | 9 | 9 |
| Bending strength (MPa) | 84 | 80 | 71 | 61 | 65 | 68 |
| Bending modulus (MPa) | 2520 | 1940 | 2020 | 1670 | 1980 | 2060 |
| Comparative tracking Index (V) | 250 | 250 | over 600 | over 600 | over 600 | over 600 |
| Glow wire test | pass | pass | pass | pass | pass | pass |
| UL-94 (1.6 mm rod) | V-0 | V-0 | V-0 | V-0 | V-0 | V-0 |
| FLAME OUT TIME (sec.) | 1 | 1 | 2 | 2 | 1 | 1 |

We claim:

1. A polymer mixture which comprises the following constituents:
   A. a polybutylene terephthalate;
   B. a thermoplastic elastomer of polyetherester block copolymer, characterized in that the polymer mixture moreover comprises
   C. a brominated polystyrene as a flame-retardant, the polyetherester block copolymer being present in an amount effective to raise the comparative tracking index of the polybutylene terephthalate and the brominated polystyrene.

2. A polymer mixture as claimed in claim 1, characterised in that the polymer mixture comprises per 100 parts by weight of the sum of the constituents A, B and C
   50–80 parts by weight of constituent A,
   5–20 parts by weight of constituent B, and
   15–30 parts by weight of constituent C.

3. A polymer mixture as claimed in claim 1, characterized in that the polymer mixture comprises as constituent A. a polymer or a copolymer which is built up for more than 70 mold from units derived from terephthalic acid and butane-1,4-diol.

4. A polymer mixture as claimed in claim 1, characterized in that the polymer mixture comprises a metal compound which cooperates synergistically with the brominated polystyrene.

5. A polymer mixture as claimed in claim 1, characterised in that in addition to the constituents mentioned hereinbefore sub A, B and C, the polymer mixture comprises 1–100 parts by weight of conventionally used additives per 100 parts by weight of A plus B plus C.

6. Articles formed from the polymer mixture as claimed in claims 1, 4 or 5.

7. A method of improving the comparative tracking index of a mixture of polybutylene terephthalate and brominated polystyrene flame retardant, comprising adding an effective amount of a polyetherester block copolymer thermoplastic elastomer to raise the comparative tracking index of the mixture of polybutylene terephthalate and brominated polystyrene.

8. The method as claimed in claim 7, wherein the amount of thermoplastic elastomer is sufficient to raise the comparative tracking index of the mixture to at least about 600.

9. The method as claimed in claim 7, wherein the amount of brominated polystyrene is about 15 to about 30 parts by weight and the amount of thermoplastic elastomer is about 5 to about 20 parts by weight based on 100 parts by weight of the polybutylene terephthalate, the thermoplastic elastomer and the brominated polystyrene.

10. The method as claimed in claim 7, wherein the polymer mixture comprises per 100 parts by weight of the sum of the constituents, about 50 to about 80 parts by weight of polybutylene terephthalate, about 5 to about 20 parts by weight of thermoplastic elastomer, and about 15 to about 30 parts by weight of brominated polystyrene.

11. The method as claimed in claim 7, further comprising adding to the polybutylene terephthalate, thermoplastic polymer and brominated polystyrene about 1 to about 100 parts by weight of additives per 100 parts by weight of polybutylene terephthalate, thermoplastic polymer and brominated polystyrene.

12. The method as claimed in claim 7, further comprising adding to the polymer mixture a metal compound which cooperates synergistically with the brominated polystyrene to improve the flame retardance of the polymer mixture.

* * * * *